(12) United States Patent
Kikkawa et al.

(10) Patent No.: US 7,651,389 B2
(45) Date of Patent: Jan. 26, 2010

(54) EXHAUST SMOKE-PROCESSING SYSTEM

(75) Inventors: Hirofumi Kikkawa, Kure (JP); Takanori Nakamoto, Kure (JP); Toshio Katsube, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/527,034

(22) PCT Filed: Sep. 8, 2003

(86) PCT No.: PCT/JP03/11450

§ 371 (c)(1),
(2), (4) Date: Sep. 29, 2005

(87) PCT Pub. No.: WO2004/023040

PCT Pub. Date: Mar. 18, 2004

(65) Prior Publication Data

US 2006/0099902 A1     May 11, 2006

(30) Foreign Application Priority Data

Sep. 9, 2002   (JP) .............................. 2002-263191

(51) Int. Cl.
*B01D 47/06* (2006.01)
(52) U.S. Cl. .................... 454/55; 423/243.01
(58) Field of Classification Search .................. 454/55; 423/243.01

See application file for complete search history.

(56) References Cited

U.S. PATENT DOCUMENTS

| 3,772,192 | A | * | 11/1973 | Huckstedt et al. | ............ 210/704 |
|---|---|---|---|---|---|
| 4,241,953 | A | * | 12/1980 | Bradford et al. | ................ 299/4 |
| 4,377,483 | A | * | 3/1983 | Yamashita et al. | .......... 210/670 |
| 4,614,645 | A | * | 9/1986 | Yoneda et al. | .......... 423/240 R |
| 4,615,808 | A | * | 10/1986 | Gallup et al. | ................ 210/714 |
| 5,275,556 | A | * | 1/1994 | Hirose | ........................ 432/180 |
| 5,282,355 | A | * | 2/1994 | Yamaguchi | .................. 60/39.5 |
| 5,322,629 | A | * | 6/1994 | Stewart | ...................... 210/767 |
| 5,324,499 | A | * | 6/1994 | Sturgeoff et al. | ............ 423/531 |
| 5,433,932 | A | * | 7/1995 | Clausen et al. | .............. 423/208 |
| 6,216,967 | B1 | * | 4/2001 | Hoberg et al. | .................. 241/21 |

FOREIGN PATENT DOCUMENTS

| JP | 2-298316 A | 12/1990 |
|---|---|---|
| JP | 91600/1990 | 4/1992 |
| JP | 9-122438 A | 5/1997 |
| JP | 2000-325746 A | 11/2000 |
| JP | 2001-198434 A | 7/2001 |

* cited by examiner

*Primary Examiner*—Steven B McAllister
*Assistant Examiner*—Samantha A Miller
(74) *Attorney, Agent, or Firm*—Fay Sharpe LLP

(57) ABSTRACT

An exhaust smoke processing system comprises air preheater for heating combustion air by exhaust smoke discharged from a boiler, a heat recoverer for heating a heat medium by exhaust smoke discharged from the air preheater, a dust collector for collecting soot and dust in exhaust smoke discharged from the heat recoverer, a wet-type exhaust smoke processing apparatus for processing exhaust smoke discharged from the dust collector, a reheater for heating exhaust smoke discharged from the wet-type exhaust smoke processing apparatus by the heat medium, and a heat medium circulation pipe passage for circulating the heating medium between the reheater and the heat recoverer. the system measures a heavy metal concentration in the exhaust smoke and adjusts the temperature of exhaust smoke at an outlet of the heat recoverer such that the measured value falls within a predetermined range.

5 Claims, 2 Drawing Sheets

EXHAUST SMOKE-PROCESSING SYSTEM

TECHNICAL FIELD

The present invention relates to an exhaust smoke processing system, and more particularly, to an exhaust smoke processing system in which in order to reduce the heavy metal concentration in exhaust smoke discharged from a smokestack, a heat recoverer for reheating exhaust smoke discharged from a wet-type exhaust smoke processing apparatus is disposed upstream of a dust collecting apparatus such as a bag filter or an electrostatic precipitator, thereby lowering the temperature of the exhaust smoke at an inlet of the electrostatic precipitator.

BACKGROUND TECHNIQUE

A fossil fuel such as coal includes heavy metal which is harmful to a human body although an amount thereof is very small. When the fossil fuel is burned, most of them become gas. In a thermal power plant or the like, after most of nitrogen oxide (NOx), sulfur oxide (SOx) and smoke and dust in the exhaust smoke generated when coal or the like is burned is removed, the remainder thereof is discharged to atmosphere from a smokestack. However, a portion of the heavy metal is not completely removed by a dust collecting apparatus which collects smoke and dust in the exhaust smoke or by a desulfurization apparatus which removes sulfur oxide. Examples of elements of heavy metal included in coal which are easily discharged from smokestack are mercury, selenium, arsenic, chromium, lead and the like having high volatility. Although the concentration of these elements in the exhaust smoke when they are discharged from the smokestack is not high, it is desired that its processing technique becomes widespread, since their toxicity is high. For example, there is proposed a mercury processing method in the exhaust gas discharged from a refuse incinerator as a method for removing mercury in the exhaust gas (Japanese Patent Publications Nos. H6-61424 and H6-104182). This is because that higher concentration mercury is included in exhaust gas from the refuse incinerator.

According to the techniques disclosed in the above publications, liquid absorbent or solid absorbent is sprayed into exhaust gas, mercury in the exhaust gas is collected by the absorbent, and the absorbent which collected the mercury together with dust in the exhaust gas is collected by a dust collecting apparatus such as a downstream bag filter or a electrostatic precipitator. It is proposed that powder activated carbon is sprayed upstream of a bag filter which removes mercury, and it is collected by a downstream bag filter (Felsvang K. et al.: Activated carbon injection in spray dryer/ESP/FF for mercury and toxics control: Fuel Process Tech. 39 PP. 417-430 (1994)).

According to these conventional techniques, however, an apparatus which sprays liquid absorbent or solid absorbent into exhaust gas, and a reactor which brings liquid absorbent or solid absorbent and exhaust gas into contact for a certain time (normally several seconds) are required, and it is necessary to secure the installation space therefore. Further, liquid absorbent or solid absorbent is expensive., and there is a problem that the processing cost is increased.

That is, according to the conventional techniques, consumption amount of expensive liquid absorbent or solid absorbent is large, and the reactor and the apparatus for spraying liquid absorbent or solid absorbent into exhaust gas are required, and it is necessary to secure the installation space therefore. It is an object of the present invention to propose an exhaust smoke processing system capable of solving these problems and capable of economically removing heavy metal.

DISCLOSURE OF THE INVENTION

The object of the present invention can be achieved by the following means. That is, the exhaust smoke processing system comprises an air preheater for heating air for combustion by exhaust smoke discharged from a boiler, a heat recoverer for heating a heat medium by exhaust smoke discharged from the air preheater, a dust collector for collecting soot and dust in exhaust smoke discharged from the heat recoverer, a wet-type exhaust smoke processing apparatus for wet-type processing exhaust smoke discharged from the dust collector, a reheater for heating exhaust smoke discharged from the wet-type exhaust smoke processing apparatus by the heating medium, and a heat medium circulation pipe for circulating the heating medium between the reheater and the heat recoverer. The heat medium circulation pipe passage is provided with temperature control means which measures a heavy metal concentration in exhaust smoke discharged from any one or more of the dust collector, the wet-type exhaust smoke processing apparatus and the reheater, and adjust the temperature of exhaust smoke at an outlet of the heat recoverer such that the heavy metal concentration falls within a predetermined range. With this, even if composition of coal to be burned or the temperature of exhaust smoke at the inlet of the heat recoverer is varied, the heavy metal concentration in exhaust smoke discharged into the atmosphere can fall within the predetermined range. In this case, the temperature control means can be realized by using any one of or more of means for adjusting a heat medium circulation flow rate of the heat medium circulating between the reheater and the heat recoverer, means for cooling the heat medium, means for heating the heat medium, and means which disposes a bypass pipe for connecting an inlet and an outlet of a passage of the heating medium flowing into the heat recoverer and which adjusts a flow rate of the heat medium in the bypass pipe. A method described in Japanese Patent Applications Laid-open Nos. H9-122438 and H11-347332 can be used as the means for controlling the temperature of exhaust smoke at the outlet of the heat recoverer.

Further, the present invention provides an exhaust smoke processing system comprising an air preheater for heating combustion air by exhaust smoke discharged from a boiler, a dust collector for collecting soot and dust in exhaust smoke discharged from the air preheater, and a wet-type exhaust smoke processing apparatus for wet-type processing exhaust smoke discharged from the dust collector. This system further comprises control means which measures a heavy metal concentration in exhaust smoke discharged from the wet-type exhaust smoke processing apparatus, and which adjusts any one or more of pH of liquid absorbent of the wet-type exhaust smoke processing apparatus, a flow rate of oxidizing-air, and a flow rate of waste water, such that the heavy metal concentration falls within a predetermined range.

In this invention, most of heavy metal in the exhaust smoke exists as gas in a high temperature region in the boiler, but if the temperature of the exhaust smoke is lowered, the heavy metal becomes prone to be attached to a surface of solid particle such as ash particle. This is because that as the temperature of the element and compound becomes lower, the vapor pressure becomes lower also, and the heavy metal can not easily exist as gas. Therefore, in the case of the dust collecting apparatus which collects smoke and dust in exhaust smoke, as the temperature of the exhaust smoke is lower, the apparatus can collect more the heavy metal together with ash particle. It is possible to remove and collect the heavy metal in the collected ash as required, or to stabilize the corrected ash such that the heavy metal is not eluted from the ash particle. However, if the temperature of the exhaust gas in the dust collecting apparatus becomes excessively low, the ash particle becomes prone to be agglutinated, and there is a problem that the ash particle can not easily be discharged from an ash collecting section (hopper) provided in a lower portion of the dust collecting apparatus. Therefore, if the heavy metal concentration in exhaust smoke is measured under the temperature condition of the exhaust smoke capable of stably collecting ash from the dust collecting apparatus, and if the temperature of exhaust smoke at the outlet of the heat recoverer (inlet of the dust collecting apparatus) is adjusted such that the component concentration falls within the predetermined range, it is possible to control the concentration of heavy metal discharged from the smokestack into the atmosphere.

The exhaust gas including heavy metal which was not removed by the dust collecting apparatus enters the downstream wet-type exhaust smoke processing apparatus, and sulfur dioxide gas ($SO_2$) in the exhaust gas is removed by the liquid absorbent. At that time, a portion of the heavy metal is absorbed by the liquid absorbent. The present inventors researched and found that pH of liquid absorbent, the flow rate of oxidizing-air and concentration of heavy metal in the liquid absorbent affect the removing efficiency of the heavy metal. That is, as the pH and the heavy metal concentration in the liquid absorbent are lower, or as the flow rate of oxidizing-air is higher, the removing efficiency of heavy metal by the wet-type desulfurization apparatus becomes higher. Therefore, when the heavy metal concentration in the exhaust smoke discharged into the atmosphere is high, the problem can be solved by lowering pH of liquid absorbent, increasing the amount of waste water to be discharged, or increasing the oxidizing-air. In this manner, it is possible to control the heavy metal concentration discharged from the smokestack into the atmosphere by measuring the heavy metal component in exhaust smoke discharged from the wet-type desulfurization apparatus, and by adjusting any one or more of pH of liquid absorbent of the wet-type exhaust smoke processing apparatus, a flow rate of oxidizing-air, and a flow rate of waste water.

Explanation of symbols: 1 . . . boiler, 2 . . . denitration apparatus, 3 . . . air preheater, 4 . . . electrostatic precipitator, 5 . . . induced draft fan, 6 . . . wet-type desulfurization apparatus, 7 . . . desulfurization fan, 8 . . . smokestack, 9 . . . measuring apparatus 10 . . . pump, 11 . . . heat recoverer, 12 . . . heat-transfer piping, 13 . . . reheater, 14 . . . heat-transfer piping, 15 . . . heat medium circulation pipe passage, 16 . . . heat medium bypass line, 17 . . . thermometer, 18 . . . flow regulating valve, 19 . . . heat exchanger, 20 . . . supply pipe, 21 . . . flow regulating valve, 31 . . . inlet duct, 32 . . . desulfurization tower body, 33 . . . outlet duct, 34 . . . liquid absorbent circulation line, 35 . . . pump, 36 . . . spray nozzle, 37 . . . circulation tank, 38 . . . agitator, 39 . . . air supply pipe, 40 . . . limestone slurry tank, 41 . . . pump, 42 . . . limestone supply pipe, 43 . . . pH meter, 44 . . . valve, 45 . . . plaster drawing-out pipe, 46 . . . dewater, 47 . . . return piping, 48 . . . waste pipe.

BEST MODE FOR CARRYING OUT THE INVENTION

Next, the present invention will be explained in more detail by way of Examples.

Example 1

Figure 1:
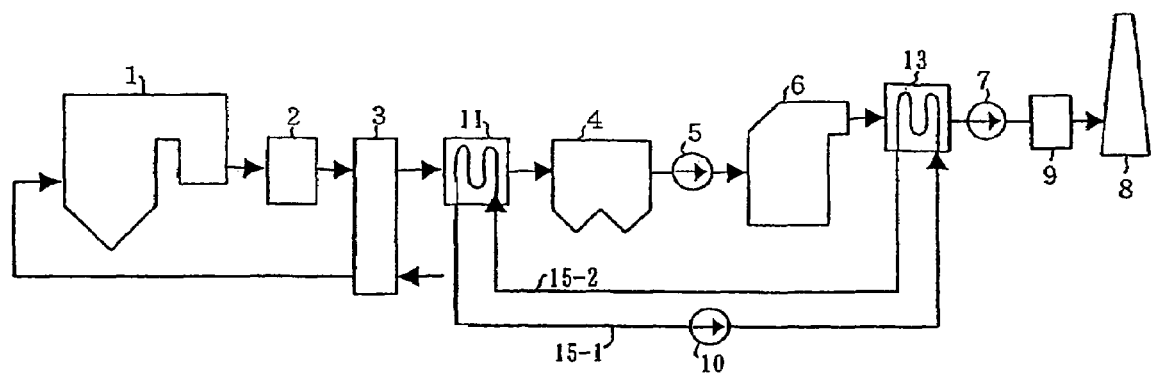
FIG. 1 shows a basic structure of a system of the present invention.

FIG. 1 is a block diagram of an exhaust smoke processing system according to an embodiment of the invention. According to the exhaust smoke processing system of this embodiment, exhaust smoke discharged from a boiler 1 is introduced into a denitration apparatus 2. Here, nitrogen oxide in exhaust smoke is removed and then, the exhaust smoke is introduced into an air preheater 3. The exhaust smoke introduced into the air preheater 3 is heat-exchanged with combustion air supplied to the boiler 1 to be cooled to 120 to 155° C., for example, and is introduced into a heat recoverer 11. Heat of exhaust smoke introduced into the heat recoverer 11 is recovered in heat medium flowing in a heat-transfer pipe by heat exchange, the exhaust smoke is cooled to 75 to 110° C., for example and is introduced into an electrostatic precipitator 4. Here, most of smoke and dust in the exhaust smoke is collected. The exhaust smoke which passed through the electrostatic precipitator 4 is increased in pressure by an induced draft fan 5, and is introduced into a wet-type desulfurization apparatus 6 using a spray-type limestone-plaster method, for example, wherein Sox in the exhaust smoke is removed by gas-liquid contact. The exhaust smoke which was cooled to a saturated gas temperature in the wet-type desulfurization apparatus 6 is increased in temperature in a reheater 13, and the exhaust smoke is discharged from a smokestack 8 through a desulfurization fan 7. Like the heat recoverer 11, the reheater 13 is a heat exchanger having a heat-transfer pipe through which heat medium flows. The exhaust smoke is heat-exchanged with the heat medium flowing through the heat-transfer pipe to be increased in temperature to 90 to 110° C., for example. The heat recoverer 11 and the heat-transfer pipe of the reheater 13 are in communication with each other through heat medium circulation pipe passages 15-1, 15-2, wherein the heat medium is circulated between the heat recoverer 11 and the reheater 13 by a pump 10. The heavy metal concentration in exhaust gas at an inlet of the smokestack 8 is measured by a measuring apparatus 9, and the temperature of exhaust gas at outlet of the heat recoverer 11 (inlet of the electric dust collector 4) is controlled based on the measured value.

In this manner, according to the exhaust smoke processing system of the present invention, the removing efficiency of heavy metal in the exhaust gas can be enhanced by controlling the temperature of exhaust gas at outlet of the heat recoverer 11 (inlet of the electric dust collector 4).

Figure 2:
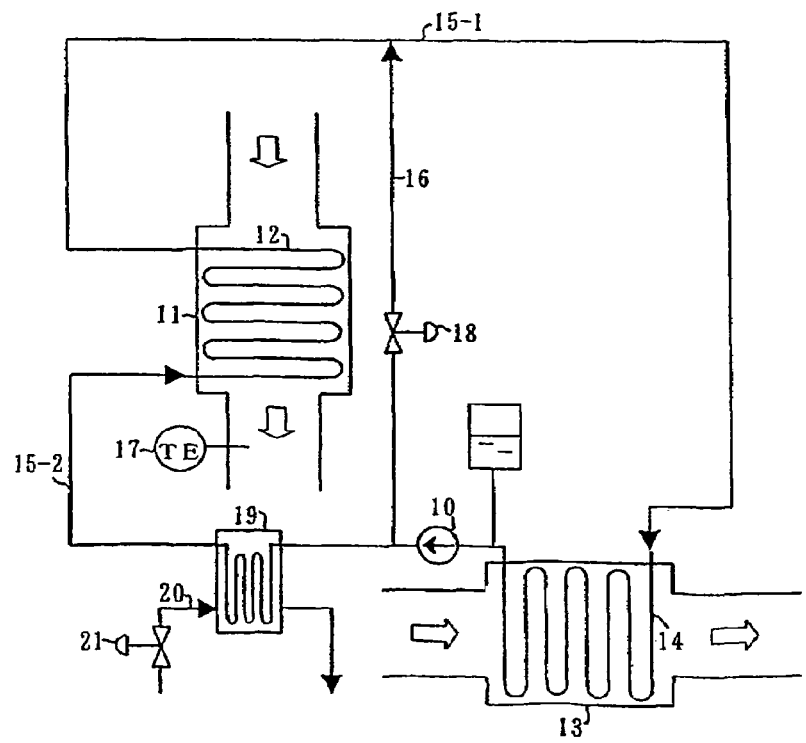
FIG. 2 shows a detailed structure of the system of the invention.

FIG. 2 shows details of heat medium circulating system of the heat recoverer and the reheater according to the feature of the present invention. The heat-transfer piping 12 of the heat recoverer 11 and the heat-transfer piping 14 of the reheater 13 are annularly connected to each other through the heat medium circulation pipe passages 15-1, 15-2, and the circulation pump 10 is provided at an intermediate portion of the passages. The heat medium is circulated in the heat-transfer pipings 12 and 14 by the circulation pump 10. The heat-transfer pipings 12 and 14 use fin tubes to enhance the heat exchange efficiency. To absorb the expansion of the heat medium in the passage, heat medium tank is disposed.

A concrete method for controlling the temperature of exhaust gas at the outlet of the heat recoverer 11 (inlet of the electric dust collector 4) will be explained below.

A heat medium bypass line 16 is provided for controlling the temperature of exhaust smoke at the outlet of the heat recoverer 11. A thermometer 17 measures the temperature of exhaust smoke at the outlet of the heat recoverer 11. An opening of a flow regulating valve 18 is adjusted to control the heat collecting amount such that the temperature of the exhaust smoke at the outlet of the heat recoverer 11 becomes equal to or higher than a set value by a signal of the thermometer 17. A heat exchanger 19 is provided in the heat medium circulation pipe passage 15-2. Vapor or cooling water is allowed to flow to the heat exchanger 19 from a supply pipe 20 while adjusting the opening of the flow regulating valve 21, thereby controlling the temperature of the exhaust smoke at the outlet of the heat recoverer 11.

It is also possible to control the temperature of the exhaust smoke at the outlet of the heat recoverer 11 by adjusting the flow rate of the pump 10. For example, when the value measured by the measuring apparatus 9 is higher than a predetermined value, the flow rate of the pump 10 is increased, the amount of heat exchange between the heat recoverer 11 and the reheater 13 is increased, and the temperature of the exhaust smoke at the outlet of the heat recoverer 11 (inlet of electric dust collector 4) is reduced. However, if the flow rate of the pump 10 is decreased to reduce the heat exchange amount between the heat recoverer 11 and the reheater 13, the temperature of exhaust gas at the outlet of the reheater 13 is lowered, mist scattered from the wet-type desulfurization apparatus sticks to a surface of the heat-transfer pipe 14, and this may cause corrosion.

In the example shown in FIGS. 1 and 2, the temperature of the exhaust smoke at the outlet of the heat recoverer 11 (inlet of electric dust collector 4) was adjusted to a predetermined value, and the heavy metal concentration in the exhaust gas at the inlet of the smokestack 8 was measured by the measuring apparatus 9. Table 1 shows a result of the above measurement. In Table 1, relative values based on the values at 80° C. are shown.

TABLE 1

Result of analysis of heavy metal concentration in exhaust gas (−)

| | Exhaust gas temperature (° C.) | | | |
|---|---|---|---|---|
| | 80 | 100 | 120 | 140 |
| Mercury | 1.0 | 1.5 | 2.5 | 3.5 |
| Selenium | 1.0 | 1.4 | 2.2 | 3.0 |

Example 2

In the exhaust smoke processing system shown in FIG. 1, it is also possible to control the heavy metal concentration in exhaust gas discharged into the atmosphere, by adjusting one or more of operation conditions of the desulfurization apparatus 6, pH of liquid absorbent, oxidizing-air flow rate, and waste water flow rate.

Figure 3:
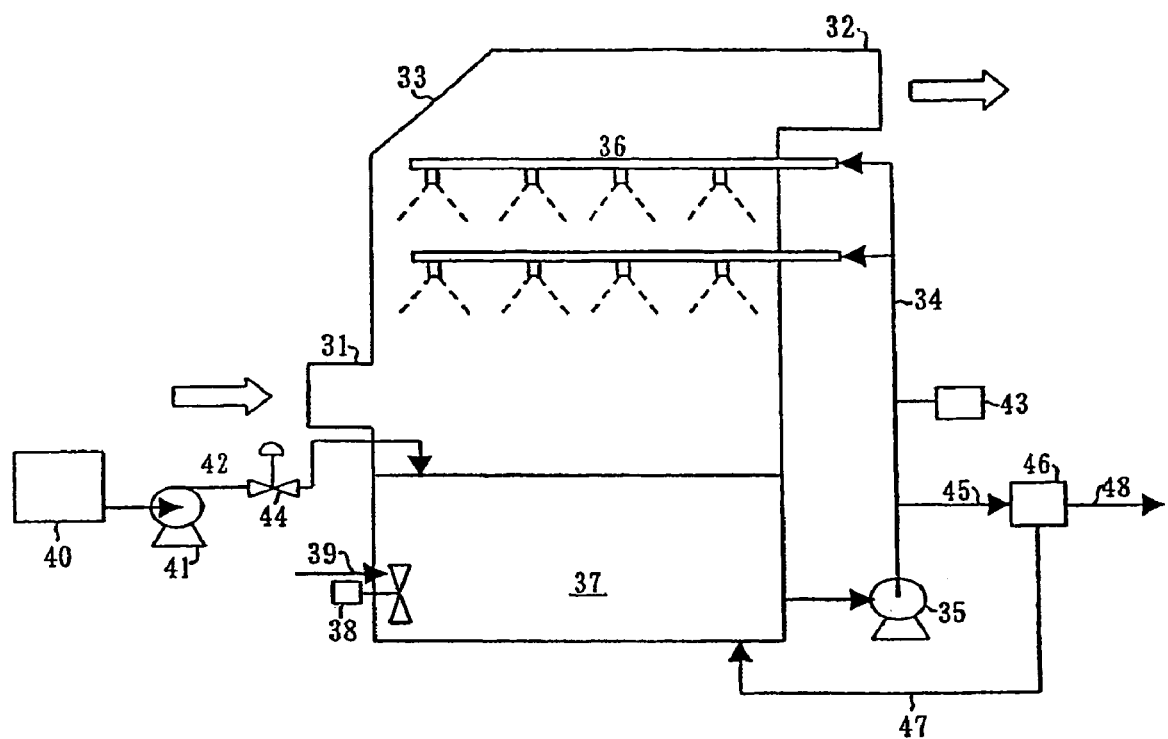
FIG. 3 shows a detailed structure of the system of the invention.

FIG. 3 shows a detail structure of the desulfurization apparatus 6. Exhaust gas including heavy metal that was not removed by the dust collecting apparatus (not shown) is introduced into a desulfurization tower body 33 from an inlet duct 31 and is discharged from an outlet duct 32. During that time, liquid absorbent sent by a pump 35 through a liquid absorbent circulation line 34 is sprayed from a plurality of spray nozzles 36 in the desulfurization tower, and the liquid absorbent and the exhaust gas come into contact with each other in a liquid/gas contact manner. At that time, the liquid absorbent absorbs $SO_2$ in the exhaust gas and produces calcium sulfite. The liquid absorbent that produced calcium sulfite is accumulated in a circulation tank 37 and stirred by an agitator 38 and in this state, calcium sulfite in the liquid absorbent is oxidized by air supplied from an air supply pipe 39, to produce plaster. Desulfuirizer such as limestone is added to the liquid absorbent in the circulation tank 37 through a limestone supply pipe 42 by a pump 41 from a limestone slurry tank 40. An amount of limestone to be supplied is adjusted by a valve 44 based on an instructed value of a pH meter 43 disposed in the liquid absorbent circulation line 34. A portion of the liquid absorbent in the tank where limestone and plaster coexist is sent through a plaster drawing-out pipe 45 to a dewater 46, where the plaster is recovered. A portion of filtrate of the dewater is returned into the circulation tank 37 through the return piping 47, and the remainder is discharged from the waste pipe 48 to outside of the system as waste water.

When pH of liquid absorbent of the desulfurization apparatus shown in FIG. 3 was changed, a mercury concentration change in exhaust gas at the outlet of the desulfurization apparatus was measured. The result is shown in Table 2, where relative values based on values at pH4.5 are shown. As pH is lower, the mercury concentration in exhaust gas at the outlet of the desulfurization apparatus is lower. However, if pH of liquid absorbent becomes lower, as desulfurization performance is deteriorated, it is necessary to increase a liquid and gas ratio (L/G).

TABLE 2

Result of analysis of heavy metal mercury concentration in exhaust gas (−)

| | pH | | | |
|---|---|---|---|---|
| | 4.5 | 5.0 | 5.5 | 6.0 |
| Mercury | 1.0 | 2.5 | 3.5 | 5.0 |

In the system diagram of FIG. 3, calcium sulfite in liquid absorbent is oxidized in the circulation tank 37 by air supplied from the air supply pipe 39 to generate plaster. At that time, if the amount of oxidizing-air is not sufficient, calcium sulfite remains, and the removing rate of heavy metal is lowered. A mercury concentration change in exhaust gas at the outlet of the desulfurization apparatus was measured when a sulfur dioxide concentration in liquid absorbent was changed. The result is shown in Tale 3, where relative values based on values of sulfur dioxide concentration 0.0 (mmol/L) are shown. There is a tendency that as the sulfur dioxide concentration becomes higher, the mercury concentration in exhaust gas at the outlet of the desulfurization apparatus becomes higher.

TABLE 3

Result of analysis of heavy metal mercury concentration in exhaust gas (−)

| | Sulfur dioxide concentration (mmol/L) | | | |
|---|---|---|---|---|
| | 0.0 | 1.0 | 2.0 | 3.0 |
| Mercury | 1.0 | 2.0 | 4.5 | 6.0 |

As shown in the system diagram of FIG. 3, the desulfurization liquid absorbent is sent to the dewater 46, where plaster is recovered, and a portion of the filtrate is returned into the circulation tank 37 through the return piping 47. A portion of the heavy metal removed in the desulfurization apparatus is concentrated in the liquid absorbent. The mercury concentration change in exhaust gas at the outlet of the desulfurization apparatus was measured when the mercury concentration of the liquid absorbent was changed. The result is shown in Table 4, where relative values based on values of mercury concentration 0.03 (mmol/L) are shown. As the heavy metal concentration in liquid absorbent becomes higher, its removing performance becomes lower. Therefore, in order to enhance the removing performance, it is necessary to increase the amount of water discharged from the system from the waste pipe 48.

TABLE 4

| Result of analysis of heavy metal mercury concentration in exhaust gas (−) | | | | |
|---|---|---|---|---|
| | Mercury concentration (mmol/L) | | | |
| | 0.03 | 0.1 | 0.2 | 0.3 |
| Mercury | 1.0 | 2.5 | 3.5 | 4.5 |

The problem that the heavy metal concentration in exhaust gas discharged into atmosphere is high, can be solved by lowering pH of liquid absorbent, increasing the amount of water to be discharged, and increasing the oxidizing-air.

Although the electrostatic precipitator is used in this embodiment, a bag filter can be used instead thereof.

Although it is not described in the embodiment, in order to remove solid particle such as ash particle stuck to a surface of the heat-transfer pipe 12 of the-heat recoverer 11 shown in FIGS. 1 and 2, an apparatus (soot blower) which blows air or vapor to remove the particle is disposed. If the soot blower is used, the smoke and dust concentration in exhaust gas is temporarily increased and with this, the heavy metal concentration in the exhaust gas is also increased. Therefore, it is preferable to take the timing for operating the soot blower into consideration.

INDUSTRIAL APPLICABILITY

The present invention can economically provide an exhaust smoke processing system in which the heavy metal concentration in exhaust smoke discharged from smokestack is reduced.

The invention claimed is:

1. An exhaust smoke processing system comprising an air preheater for heating combustion air by exhaust smoke discharged from a boiler, a heat recoverer for heating a heat medium by exhaust smoke discharged from the air preheater, a dust collector for collecting soot and dust in exhaust smoke discharged from the heat recoverer, a wet-type exhaust smoke processing apparatus for wet-type processing exhaust smoke discharged from the dust collector, a reheater for heating exhaust smoke discharged from the wet-type exhaust smoke processing apparatus by the heat medium, and a heat medium circulation pipe passage for circulating the heat medium between the reheater and the heat recoverer, and a measuring means which measures a mercury concentration in exhaust smoke discharged from any one or more of the dust collector, the wet-type exhaust smoke processing apparatus and the reheater, the heat medium circulation pipe passage being provided with temperature control means which adjust the temperature of exhaust smoke at an outlet of the heat recoverer such that the mercury concentration falls within a predetermined range.

2. The exhaust smoke processing system according to claim 1, wherein the temperature control means is any one of or more of means for adjusting a heat medium circulation flow rate of the heat medium circulating between the reheater and the heat recoverer, means for cooling the heat medium, means for heating the heat medium, and means which disposes a bypass pipe for connecting an inlet and an outlet of a passage of the heat medium flowing into the heat recoverer and which adjusts a flow rate of the heat medium in the bypass pipe.

3. An exhaust smoke processing system comprising an air preheater for heating combustion air by exhaust smoke discharged from a boiler, a dust collector for collecting soot and dust in exhaust smoke discharged from the air preheater, and a wet-type exhaust smoke processing apparatus for wet-type processing exhaust smoke discharged from the dust collector, wherein the system further comprises a measuring means which measures a mercury concentration in exhaust smoke discharged from the wet-type exhaust smoke processing apparatus, and controls means for adjusting any one or more of pH of liquid absorbent of the wet-type exhaust smoke processing apparatus, a flow rate of oxidizing-air, and a flow rate of waste water, such that the measured mercury concentration falls within a predetermined range.

4. An exhaust smoke processing system comprising a air preheater for heating combustion air by exhaust smoke discharged from a boiler, a heat recoverer for heating a heat medium by exhaust smoke discharged from the air preheater, a dust collector for collecting soot and dust in exhaust smoke discharged from the heat recoverer, a wet-type exhaust smoke processing apparatus for wet-type processing exhaust smoke discharged from the dust collector, a reheater for heating exhaust smoke discharged from the wet-type exhaust smoke processing apparatus by the heat medium, and a heat medium circulation pipe passage for circulating the heat medium between the reheater and the heat recoverer, wherein the system further comprises a measuring means which measures a mercury concentration in exhaust smoke discharged from the dust collector, and a control means which adjusts the temperature of exhaust smoke at an outlet of the heat recoverer such that the measured heavy metal concentration falls within a predetermined range, and which also measures the mercury concentration in exhaust smoke discharged from the wet-type exhaust smoke processing apparatus, and a control means which adjusts any one or more of pH of liquid absorbent of the wet-type exhaust smoke processing apparatus, a flow rate of oxidizing-air, and a flow rate of waste water, such that the measured heavy metal concentration falls within a predetermined range.

5. The exhaust smoke processing system of claim 1, wherein the temperature control means which measures a mercury concentration includes a measuring apparatus that measures the heavy metal concentration in exhaust smoke at an inlet of a smokestack.

* * * * *